Figure 1:
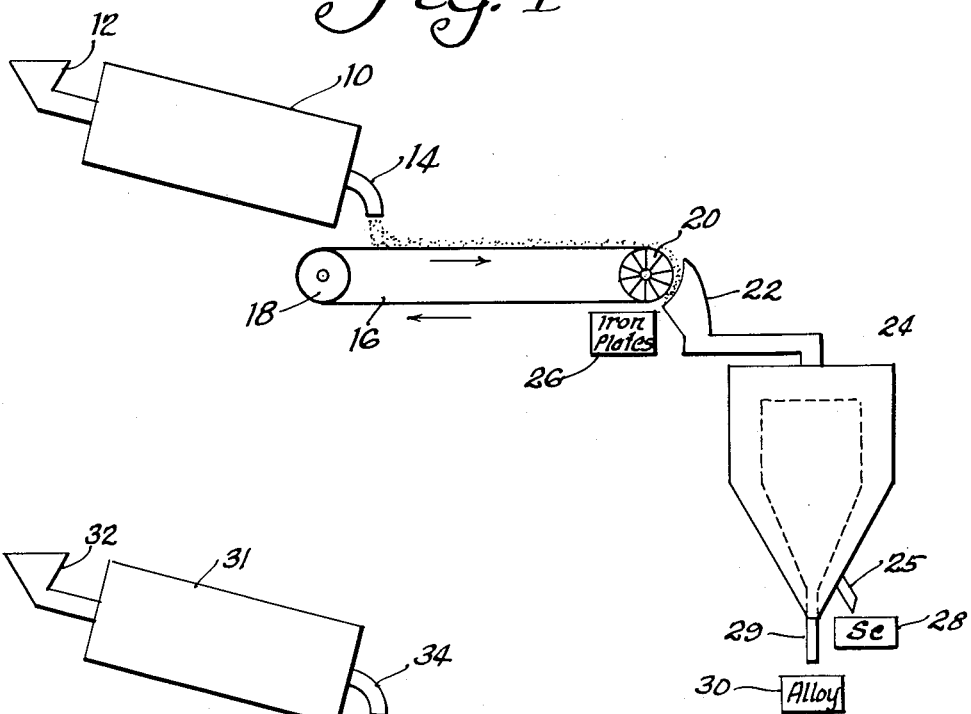

March 6, 1956    W. B. ROBERTS    2,737,348
METHOD OF RECOVERING SELENIUM
Filed Dec. 19, 1952

INVENTOR.
William B. Roberts
BY
Mason, Kolehmainen,
Rathburn & Wyss
Att'ys

United States Patent Office 2,737,348
Patented Mar. 6, 1956

2,737,348

METHOD OF RECOVERING SELENIUM

William B. Roberts, Bloomington, Ind., assignor, by mesne assignments, to Sarkes Tarzian, Inc., Bloomington, Ind., a corporation of Indiana Application December 19, 1952, Serial No. 326,877

3 Claims. (Cl. 241—24)

This invention relates to a method for recovering selenium and, more particularly, to a method for recovering selenium and other materials from rectifier plates entirely by mechanical operations.

Many of the present types of dry rectifier units are formed by superimposing a plurality of individual rectifier cells or elements, each of which is formed of a metallic base plate such as iron or nickel-plated aluminum having a superimposed layer of selenium on which is disposed a counter-electrode layer composed of metals or alloys having a low melting point such as the eutectic alloy of bismuth and cadmium. During the processes of fabrication of these rectifier plates or elements, the selenium material may become slightly contaminated or other causes may arise for rejecting the fabricated plates.

Since the value of the materials utilized in forming these rectifier elements is rather high, it is desirable to recover as much of the material in the rejected elements or plates as is possible thereby to reduce the financial loss. Previous methods for salvaging the rectifier plates require the use of one or more chemical processing operations in which chemical reagents or solvents are utilized, thereby increasing the cost of recovering the selenium and the other materials used in the rectifier plates. In addition, the efficiency of these chemical salvaging processes is to a large degree dependent upon very accurate processing control during the salvaging operation so that the original cost of the processing equipment and personnel necessary to maintain adequate process control increases the cost of recovering the material from the discarded plates.

Accordingly, one object of this invention is to provide a method for recovering usable materials from rejected rectifier plates which is entirely mechanical in operation.

Another object of this invention is the provision of a mechanical method for removing selenium and counter-electrode material from the metallic base plates used in fabricating rectifier plates.

A still further object is the provision of a method for recovering materials utilized in fabricating rectifier plates by the use of conventional processing equipment.

In accordance with these and many other objects, one embodiment of this invention comprises subjecting rejected or discarded rectifier plates to a pulverizing or comminuting process in a hammer or ball mill so that during this operation the layers of selenium and counter-electrode material are reduced to a particulate form and removed from the surface of the iron or aluminum base plates. Thereafter, the base plates are removed from the mixture of pulverized material, either by passing the mixture over an oscillating screen member of a suitable mesh, or, in the case of the iron base plates, by moving the mixture of the plates and the pulverized material over a magnetic conveyor including a single magnetic drive pulley which separates the iron plates from the mixture.

Following the separation of the base plates from the mixture of powdered materials, the particles of counter-electrode material are separated from the particles of selenium, either on the basis of the specific densities of the two materials or on the basis of their different electrical conductivities. The materials may be separated on the basis of their respective specific densities by agitating the mixture of pulverized material in a gaseous medium so that the heavier particles of counter-electrode material are separated from the lighter particles of selenium. Since the particles of alloys have a higher degree of electrical conductivity than the selenium, the mixture of pulverized materials may be separated on this basis by charging the particles of material and thereafter separating the particles on the basis of the charge remaining thereon.

Figure 2:
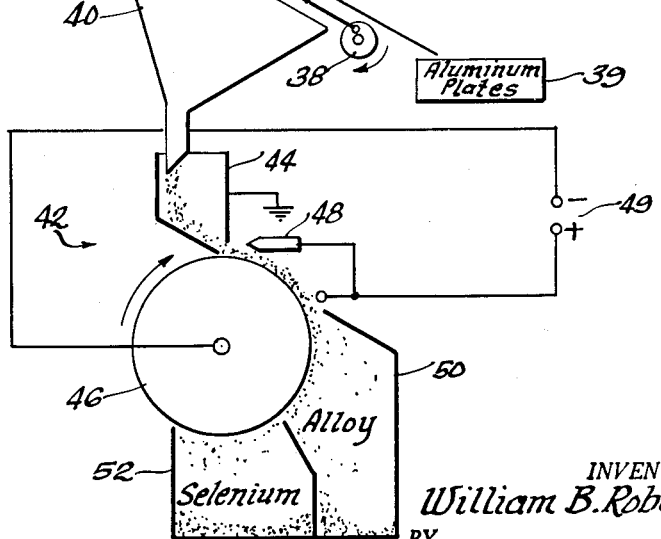

For a more complete understanding of the invention, reference should now be had to the drawings in which:

Fig. 1 is a schematic view of a suitable form of apparatus which may be utilized in carrying out the method of the present invention for recovering materials from rectifier plates; and Fig. 2 is a schematic diagram of a second form of apparatus utilized in performing the method of this invention.

In order to separate the superimposed layers of selenium and counter-electrode material from the base plates, the rectifier plates are introduced into a ball or hammer mill 10 (Fig. 1) by means of an inlet hopper 12. The rotating mill 10 is provided with comminuting elements in the form of either swing hammers or balls of sufficient size and weight as to reduce the layers of selenium and counter-electrode material to a powdered or pulverulent form, and also to remove all of these layer forming materials from the surface of the base plates. This mixture of base plates and powdered material is discharged from the mill 10 through an outlet 14 onto a moving conveyor belt 16 which extends between a pair of pulleys 18 and 20.

The apparatus shown schematically in Fig. 1 is only useful in carrying out the present invention when the rectifier plates from which the selenium is to be recovered include base plates formed of a magnetically susceptible material such as iron. The movement of the conveyor belt 16, which includes magnetically susceptible conveying elements, advances the mixture of base plates and powdered material to the point at which the material passes around the pulley 20. The pulley 20 is formed with a plurality of armature-like elements so that the mixture of the plates and the powder passes through a magnetic field produced by this pulley. The magnetic field attracts the iron base plates into engagement with the outer surface of the conveyor belt 16 and holds these plates in engagement therewith for a period of travel determined by the effective field produced by the pulley 20. However, since the powdered material is not affected by the magnetic field, this material is discharged into an inlet hopper 22 and conveyed therethrough to an air type separator 24. The iron plates are carried beyond the inlet hopper 22 because of the magnetic field produced by the magnetic pulley 20 and are thereafter discharged into a suitable receptacle 26 at such time as the movement of the conveyor belt 16 moves the iron plates beyond the effective magnetic field of the pulley 20.

The air type separator 24 separates the particles of counter-electrode material from the particles of selenium on the basis of the respective specific densities of these two materials. The specific density of selenium is 4.8 g./cc., and the specific density of the counter-electrode material is approximately 9.4 g./cc. Generally, the powdered material, upon entering the separator 24 from the inlet hopper 22, is subjected to agitation in a gaseous suspension, so that the lighter particles become entrained in the gaseous medium and are thereby separated from the heavier particles of counter-electrode material. The entrained particles of selenium are discharged from the separator 24 through an outlet spout 25 into a suitable receptacle 28, and the heavier particles of counter-electrode material are discharged from the separator 24 through a spout 29 into a receptacle 30. The separator 24 may be any one of several types well known in the art such as the Raymond Cyclone or the Sturtevant Air Separator.

The method of recovering the constituent elements of the discarded rectifier plates in the apparatus, shown in Fig. 1 of the drawings, effectively removes the layers of selenium and counter-electrode material from the iron base plates, and thereafter separates the base plates from the mixture of powdered materials. The powdered material is thereafter subjected to agitation in a gaseous suspension to separate the particles of selenium from those of the counter-electrode material so that these three materials are available for purification and reuse in fabricating additional rectifier elements. The method accomplished by the apparatus shown in Fig. 1 of the drawings is entirely mechanical in operation and it is capable of efficient operation inasmuch as only conventional and easily controlled units of processing machinery are utilized.

In a second embodiment of the invention (Fig. 2), the discarded rectifier elements including a base plate of either iron or aluminum are introduced into a ball or hammer mill 31 through an inlet hopper 32. The mill 31 is so chosen that the layers of selenium and counter-electrode material are reduced to a particulate form and completely removed from the surface of the base plates. Following the comminuting of the selenium and counter-electrode material, the base plates and the mixture of powdered material are discharged through an outlet 34 onto an oscillating screen 36 driven by a cam 38. The mesh of the screen member 36 is so chosen that the aluminum or iron base plates are discharged along the inclined slope of the screen member into a suitable receptacle 39. The particles of pulverized material, however, pass through the mesh of the screen member 36 into a hopper 40.

The hopper 40 feeds the mixture of powdered material to a separator, indicated generally by the reference numeral 42, which operates to separate the selenium particles from the particles of counter-electrode material on the basis of their respective electrical conductivities. More particularly, the powdered material in the hopper 40 is discharged into a hopper 44 which is formed of a conductive material and is also connected directly to ground. The grounded hopper 44 removes any electrostatic charge on the particles which may be due to the tribo-electric effect or due to the friction inherent in grinding and conveying this material.

The material discharged from the hopper 44 is applied to the outer surface of an electrically conductive and rotating drum 46. Immediately following the point of application of the material to the outer surface of the drum 46, an electrode 48 connected to a pulsating source of direct current 49 applies a positive electrostatic charge to all of the particles of powdered material. During the continuing rotation of the conductive drum 46, the positive charge applied to the material having the greatest conductivity leaks off through the conductive drum 46 which is connected to the negative terminal of the source 49 so that this material loses substantially all of its charge. Since the counter-electrode material possesses a greater conductivity than the selenium, the charge thereon passes through the conductive roller 46 so that the particles of counter-electrode material are substantially discharged. Since the conductive drum 46 is connected, as shown, to the negative side of the source of direct current potential, and, since the particles of counter-electrode or alloy material are not charged, these particles become displaced from the outer surface of the drum 46 during rotation thereof so as to be discharged into a receptacle 50.

However, the particles of selenium material, which are not as conductive as the particles of counter-electrode material, retain a portion of the positive electrostatic charge placed thereon by the electrode 48. This positive charge on the particles of selenium results in a force of attraction between the negatively charged surface of the drum 46 and the particles so that they are retained on the drum for a longer period of time than the particles of counter-electrode material. After a further movement of the drum 46, the weight of the particles of selenium together with the reduction in the positive charge thereon permits these particles to be displaced from the surface of the drum 46 so as to fall into a receptacle 52 wherein is collected the selenium material.

Accordingly, the method of the present invention, when performed by the apparatus shown in Fig. 2 of the drawings, effects the removal of the selenium and counter-electrode material from the surface of the iron or aluminum base plates in the form of a powder, and the mixture of powder and base plates is subsequently passed over a screen member 36 to separate the plates from the powdered material. Thereafter, the mixture of powdered material is subjected to the operation of the separator 42 which separates the particles of selenium from those of the counter-electrode material on the basis of the respective electrical conductivities of these materials so that the three constituent elements forming the rectifier plates are separated from each other and provided in such a form as to be susceptible to further refining and use in the fabrication of additional rectifier plates.

It should be understood that, although the method of this invention has been described in conjunction with two separate embodiments as illustrated in Figs. 1 and 2 of the drawings, the air type separator 24 may be utilized in Fig. 2 of the drawings in place of the separator 42; and, further, that the oscillating screen member 36 may be used in place of the magnetic separator provided by the pulleys 18 and 20 and the conveyor belt 16. Also, although only two types of separating equipment have been shown in Figs. 1 and 2 of the drawings, the use of other types of equipment for separating the selenium from the counter-electrode material on the basis of their specific densities, their electrical conductivities, or wetting abilities of the materials (floatation devices) may be utilized in place of those disclosed and described.

While particular embodiments of the invention have been shown, it will be understood, of course, that the invention is not limited thereto since many modifications may be made, and it is therefore contemplated by the appended claims to cover any such modifications as fall within the true spirit and scope of the invention.

What is claimed and desired to be secured by Letters Patent of the United States is:

1. A method of recovering materials from rectifier cells including metallic base plates carrying an intimately joined layer of selenium which in turn carries an intimately joined layer of counter-electrode metal, which method comprises subjecting said cells to triturating forces to produce a mixture consisting essentially of pulverized selenium, pulverized counter-electrode metal and said base plates, removing the plates from the mixture, and separating said pulverized selenium from said pulverized counter-electrode metal.

2. A method of recovering materials from restifier cells including metallic base plates carrying an intimately joined layer of selenium which in turn carries an intimately joined layer of counter-electrode metal, which method comprises subjecting said cells to triturating forces to produce a mixture consisting essentially of pulverized selenium, pulverized counter-electrode metal and said base plates, removing the plates from the mixture, and subjecting said pulverized mixture to an electrostatic field to facilitate separation of said pulverized selenium from said pulverized counter-electrode metal.

3. A method of recovering materials from rectifier cells including metallic base plates carrying an intimately joined layer of selenium which in turn carries an intimately joined layer of counter-electrode metal, which method comprises subjecting said cells to triturating forces to produce a mixture consisting essentially of pulverized selenium, pulverized counter-electrode metal and said base plates, removing the plates from the mixture, and subjecting said pulverized mixture to a high velocity flow of gaseous medium to entrain the particles of selenium in the flow and effect separation of said selenium particles from said pulverized counter-electrode metal.

References Cited in the file of this patent

UNITED STATES PATENTS

| Number | Name | Date |
|---|---|---|
| 971,405 | Reed | Sept. 27, 1910 |
| 1,116,951 | Sutton et al. | Nov. 10, 1914 |
| 1,842,810 | Whechel | Jan. 26, 1932 |
| 1,999,825 | Saklatwalla et al. | Apr. 30, 1935 |
| 2,144,418 | Schramm | Jan. 17, 1939 |
| 2,189,578 | Crouse et al. | Feb. 6, 1940 |
| 2,264,204 | Heckett | Nov. 25, 1941 |
| 2,388,731 | Feild | Nov. 13, 1945 |
| 2,445,229 | Masse | July 13, 1948 |